Dec. 3, 1935.  M. SCHLANK  2,022,926
MACHINE FOR THE SEPARATION OF GOLD OR OTHER
CONCENTRATE FROM SAND OR OTHER MATERIAL
Filed Oct. 26, 1933  3 Sheets-Sheet 2

Michael Schlank
INVENTOR
By Otto Munk
his ATTY.

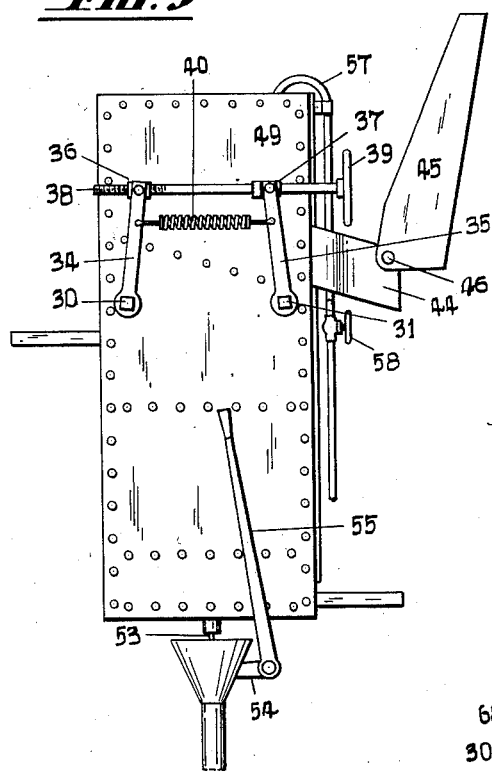
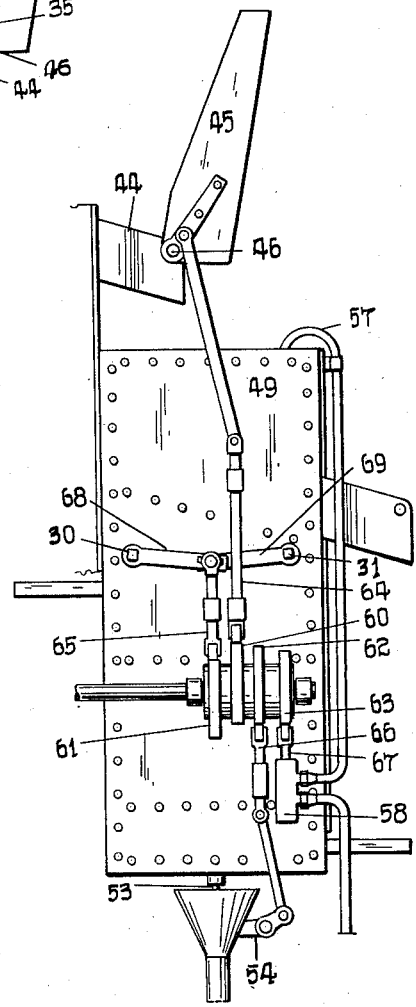
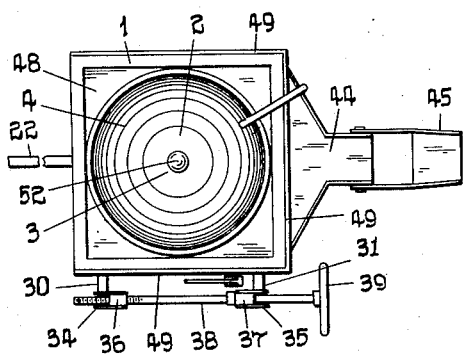

Patented Dec. 3, 1935

2,022,926

UNITED STATES PATENT OFFICE 2,022,926

MACHINE FOR THE SEPARATION OF GOLD OR OTHER CONCENTRATE FROM SAND OR OTHER MATERIAL

Michael Schlank, North Unley, Australia

Application October 26, 1933, Serial No. 695,260
In Australia November 4, 1932

4 Claims. (Cl. 233—27)

This invention relates to an improved machine for the separation of gold or other metals or materials from crushed ore, alluvial deposits, sand, clay, the dumps or tailings of mine workings or other containing medium with which they may be associated.

While my invention is particularly suitable for the recovery of gold from crushed ore and from the dumps or tailings of mine workings, it can be used for the recovery of diamonds or any minerals heavier than the sand or gangue in which they are contained. It is also suitable for the recovery of flocculent precipitates such as bismuth carbonate.

According to my invention the material containing the gold or other heavy material which it is desired to concentrate is passed with a flow of water through a series of rotating specially constructed bowls, the overflow from the topmost bowl passing into the second, that from the second into the third, and so on for as many as may be required. Each bowl retains some of the heavier material so that practically all the heavy material is concentrated. Where the specific gravity of the material to be concentrated is considerably higher than that of the sand or containing medium two or three bowls will be sufficient, but where there is little difference in the specific gravities or where the material is very finely divided it may be advisable to have nine or ten or even more bowls.

Each bowl is shaped to have its inner face curving from approximately horizontal at the centre to approximately vertical at the lip, and has upon its inner face a series of undercut circular baffles in which the gold or other heavy material to be concentrated is trapped as the sand or other containing medium mixed with water is caused to flow by centrifugal force from the centre of the rotating bowl upward and outward over the rim of the same.

The machine depends for its operation upon the difference in specific gravity of the several materials being treated, and on the slip between the materials and the bowl, the material having the greater specific gravity, which I will hereinafter call the concentrate, being caught under the baffles while that having a lower specific gravity, which I will hereinafter call the gangue, is discharged over the lip of the bowl.

The bowls are arranged within units positioned in step formation, and the feed device to each unit is so arranged that instead of passing through such unit it may be by-passed to the next unit. Each bowl is also provided with declutching means so that individual bowls may be stopped, such stopping being necessary to facilitate discharge of the concentrate. The by-passing and stopping of individual bowls is for the purpose of enabling the concentrating process to be carried out continuously when in operation so that such machine may be used for large-scale concentration.

In order that the invention may be the more clearly understood however I will now describe it with reference to the accompanying drawings in which:

Fig. 3 is a side elevation of a unit, this figure being drawn to the same scale as Fig. 1.

Fig. 4 is a view similar to Fig. 3 but, whereas in Fig. 3 the unit is shown with hand controls, in this figure the unit is shown with automatic control.

Fig. 5 is a plan of Fig. 3.

Figure 1:
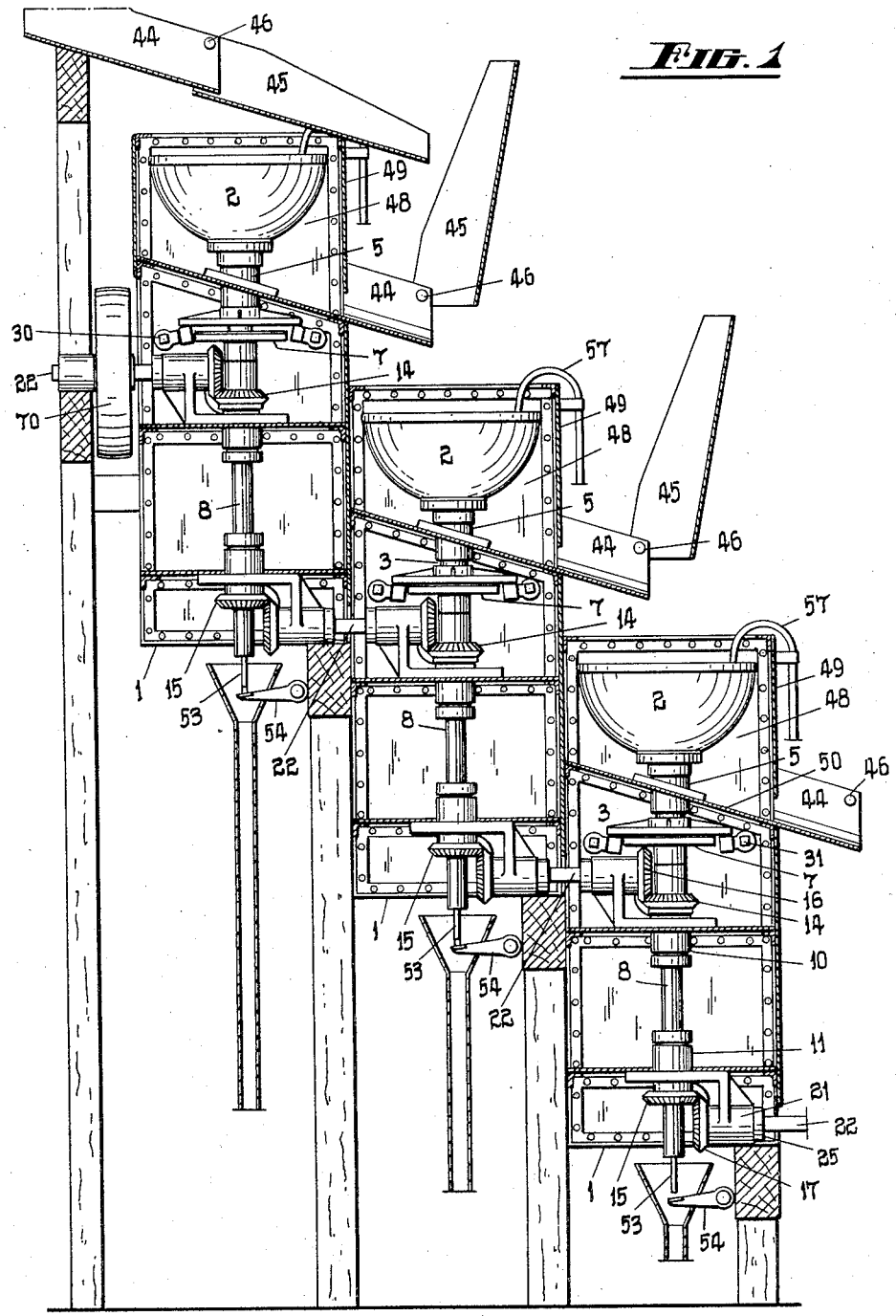
Fig. 1 is a sectional side elevation of the apparatus for separating gold or other concentrate from sand or other gangue, the apparatus being shown as consisting of three units, the first unit being by-passed as for cleaning.
Figure 2:
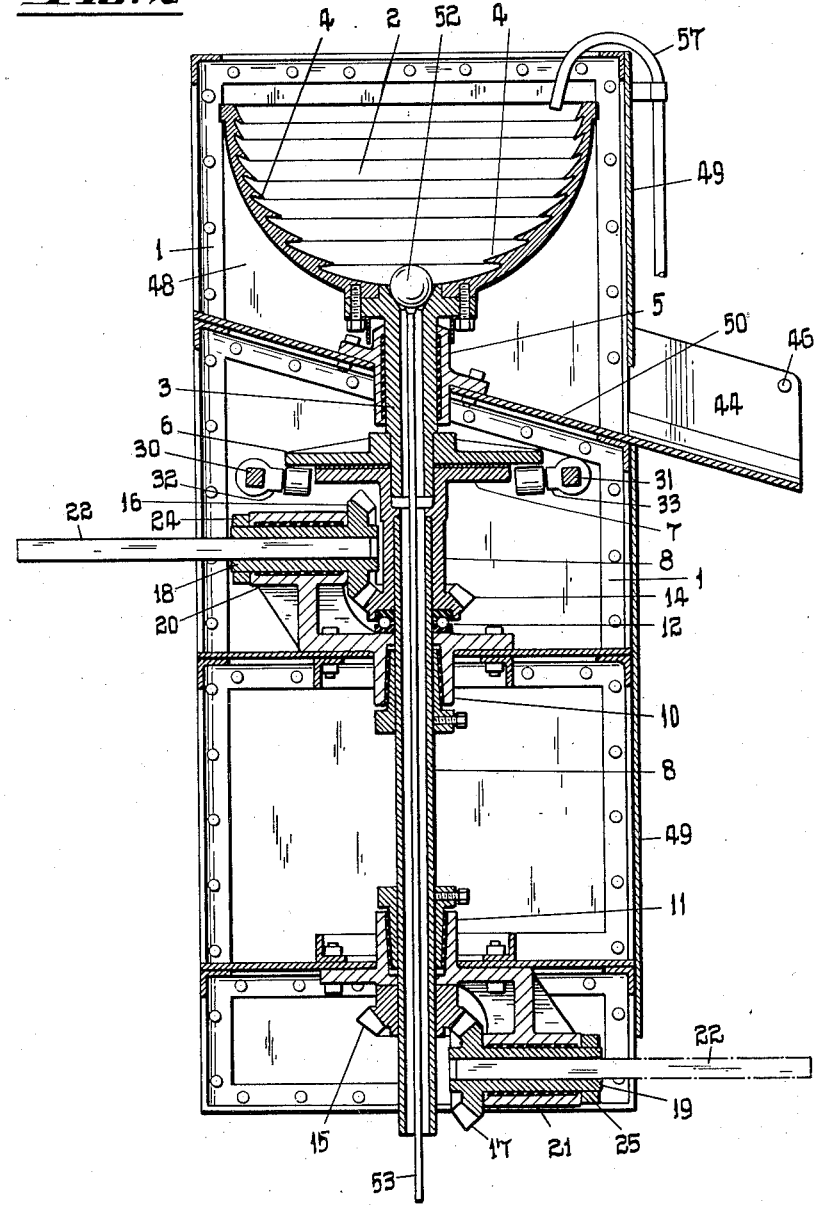
Fig. 2 is a central section of one of the units, it being drawn to a larger scale than Fig. 1.

Each unit comprises a main frame 1 in which is a bowl 2 mounted upon a vertical tubular shaft 3 whereby it is rotated. The bowl 2 has its face curving from approximately horizontal at the centre to approximately vertical at the lip, and has upon its inner face a series of undercut baffles 4.

The shaft 3 is carried in a suitable bearing 5 and has secured to it, near its lower end, a clutch plate 6. The clutch plate 6 is adapted to engage a second clutch plate 7 immediately beneath it, and this second clutch plate is secured to the top of a driven tubular shaft 8 which is coaxial with the shaft 3, the shafts 3 and 8 being aligned one with the other by the end of the one projecting into the end of the other.

The shaft 8 is shown as made in two sections but these sections are rigidly connected together and the shaft is aligned by bearings 10 and 11 secured to the main frame 1. Downward thrust on the shaft 8 is transmitted through a thrust bearing 12 to the main frame 1.

Adjacent the bearings 10 and 11, rigidly secured to the shaft 8, are bevel gears 14 and 15 which engage bevel gears 16 and 17 respectively upon hollow shafts 18 and 19 carried in bearings 20 and 21 secured to the main frame 1. The hollows in the shafts 18 and 19 are of square section and are adapted to engage square shafts 22. The shafts 18 and 19 are confined axially by the bevel gears 16 and 17 and by collars 24 and 25.

The weight of the bowl 2 and of its contents is transmitted through the shaft 3 to the upper clutch plate 6 and by it to the lower clutch plate 7 whence it is transmitted through the shaft 8 and through the thrust bearing 12 to the main frame 1. Drive applied to the shaft 8 by the square shaft 22 is thus normally transmitted through the clutch plates to the bowl 2, but to stop the rotation of the bowl 2, when such is desired, two rockshafts 30 and 31 are provided which are supported in bearings in the main frame 1 and these rockshafts have upon them arms 32 and 33 which have upon their ends rollers adapted to engage the underside of the upper clutch plate 6. When those rockshafts 30 and 31 are operated the clutch plate 6 is lifted from engagement with the clutch plate 7, the shaft 3 sliding upward in its bearing 5 and the bowl coming to rest. Reverse movement of the rockshafts 30 and 31 causes the clutch plates to re-engage. One or both of the clutch plates 6 and 7 may have their engaging surfaces leather or fabric faced to ensure a positive transmission of the drive.

The rockshafts 30 and 31 may be operated manually by two arms 34 and 35 which have at their upper ends blocks 36 and 37 through which a shaft 38 is passed, the shaft being rotatable but not slidable in the one block 37 and screwing through the other block 36, the shaft having a hand wheel 39 or other operating means. A spring 40 may be positioned between the arms 34 and 35.

The feed to the bowl 2 is by means of a chute 44. This chute 44 has a second chute 45 connected to its end by a pivot 46, which chute 45, when it is swung down, affects the length of the chute 44 and diverts the feed over the bowl instead of into it.

The bowl 2 is enclosed in a chamber 48 in the main frame 1, the chamber being formed by side and end plates 49 and by an inclined floor plate 50, so that the gangue which discharges over the lip of the bowl when the bowl is in operation is caught and led on to the next unit by a chute 44 identical with the chute 44—45 just described.

In the centre of the bowl 2 is an opening into which the tubular shaft 3 projects and the top of the shaft 3, which is flush with the floor of the bowl, has a seating for a valve 52 which normally closes the top of the shaft, but which may be raised by a rod 53 within the shafts 3 and 8. The valve 52 is raised when it is desired to discharge the concentrate from the bowl 2 after operation. The rod 53 projects from the end of the shaft 8 and engages a tappet arm 54 operated by a lever 55 or by other means.

A water pipe 57 projects into the bowl 2 the purpose of which is to supply water to the bowl to wash the concentrate from it and down the shafts 3 and 8. The water pipe 57 has a shut-off valve 58.

Instead of operating the chute 44—45, the clutch 6—7, the ball valve 52, and the shut-off valve 58 manually, they may be operated by cams 60, 61, 62 and 63 respectively, the tappet 64 of the cams 60 operating the chute 45, the tappet 65 of the cam 61 operating two arms 68 and 69 secured to the rockshafts 30 and 31 respectively, the tappet 66 of the cam 62 operating the arm 54 of the ball valve 52, and the tappet 67 of the cam 63 operating the shut-off valve 58 of the water supply.

The arrangement of the several units is as indicated in Fig. 1 of the drawings, the first unit being the highest, the remainder positioned in step formation and being coupled up by the square shafts 22 which connect together the shafts 18 and 19 of the several units. A driver wheel 70 is shown upon the shaft 22 of the first unit.

The manner of operation of my machine is as follows:

The bowls 2 are caused to rotate and the material to be treated is fed with a supply of water in a continuous stream into the first chute 44 and falls therefrom into the centre of the rotating bowl 2 and is immediately spun outwards, a large portion of the concentrate clinging to the face of the bowl while the water and gangue and the remainder of the concentrate pass upward and are discharged over the rim of the bowl and into the chamber 48 of that unit. From the chamber 48 it flows down the next chute to the second bowl, and so on. As the material begins to climb up the face of each bowl the concentrate is caught in the grooves under the projecting lips or edges of the several baffles from which owing to the centrifugal force it cannot be dislodged, the greater part being trapped in one of the lower grooves of each bowl. Even in the case of very heavy feeding an excellent extraction is secured since practically all the particles of concentrate strike direct on to the bottom of the bowl at the very outset and are in an admirable condition for saving, in that each heavy particle clings to the surface of the rotating bowl as it travels up to the baffle and the lighter particles of gangue cannot get under and displace it.

From time to time one of the units of the machine is stopped for the recovery of the concentrate from its bowl.

To remove the concentrate from one of the units the part 45 of the chute 44—45 which feeds that unit is first of all lowered to divert the feed from that unit to the next. The bowl is allowed to continue rotating for a short while until chiefly only the concentrate is left in it, whereupon the rockshafts 30 and 31 are operated to disengage the clutch plate 6 from the clutch plate 7 and the bowl thereupon ceases to rotate. The valve 52 is next raised from its seating by means of the rod 53 and the concentrate allowed to fall down the tubular shafts 3 and 8 to the settling pits or elsewhere. Water is fed into the bowl, through the pipe 57, to assist in clearing the bowl of the concentrate. So soon as the bowl is clear the water is shut off, the valve 52 is allowed to seat and the clutch plate 6 is allowed to engage the clutch plate 7 to again spin the bowl. The part 45 of the chute 44—45 is then raised and the unit resumes its operation.

It will be seen that the machine is continuous in operation as while one of the units is being cleared of concentrate the feed to such unit is by-passed to the next unit.

What I claim is:

1. For removing a material of greater specific gravity from a material of lower specific gravity a machine comprising, a series of bowls arranged in step formation and having upon their inner faces undercut baffles, means to feed material to be treated into the first bowl, means to feed material discharged from over the lip of each bowl into the next bowl, means to by-pass the feed of any bowl to the next bowl, and means to drive the bowls comprising a shaft for each bowl, the shaft of each bowl having a clutch positioned between its driving means and the bowl, there being means to operate the clutches to stop any bowl.

2. A machine as set forth in claim 1 characterized in that the supporting and driving means for each bowl comprises, a vertical shaft upon the top of which the bowl is secured and which is slidable as well as rotatable in a bearing, a clutch plate at the lower end of such shaft, a second shaft coaxial and below the first shaft and having a clutch plate at its upper end, driving means for the second shaft, and means to disengage the clutch plates comprising rockshafts to lift the upper clutch plate.

3. For removing a material of greater specific gravity from a material of lower specific gravity a machine comprising: a series of units arranged in step formation, each unit having walls forming a chamber, a rotatable bowl in said chamber having upon its inner face undercut baffles, the chamber of each unit having a sloping floor terminating in a chute having its discharge end over the bowl of the next unit, an extension so pivoted to the end of the chute of each unit that when the extension is raised the feed passes from the chute into the bowl of the next unit but when the extension is down the feed passes from such chute on to the extension and into the bowl of the next, a chute to feed material to the bowl of the first unit, an extension similar to the other extensions pivoted to the end of this chute, means to rotate the several bowls, and means to stop and discharge any bowl.

4. For removing a material of greater specific gravity from a material of lower specific gravity a machine comprising; a series of bowls arranged in step formation and each having its inner face curving from approximately horizontal at the centre to approximately vertical at the lip and having upon its inner face a series of undercut baffles, means to feed material to be treated into the first bowl, means to feed material discharged from over the lip of each bowl into the next bowl, means to by-pass the feed of any bowl to the next bowl, means to rotate the several bowls, and means to stop and discharge any bowl.

MICHAEL SCHLANK.